United States Patent [19]
Cargille

[11] 3,920,994
[45] Nov. 18, 1975

[54] HORIZON SENSOR
[75] Inventor: Donald R. Cargille, Venice, Calif.
[73] Assignee: Hughes Aircraft Company, Culver City, Calif.
[22] Filed: June 3, 1974
[21] Appl. No.: 475,679

[52] U.S. Cl. ............................... 250/347; 250/338
[51] Int. Cl.² ........................................... G01J 1/00
[58] Field of Search .................... 205/338, 347, 351

[56] References Cited
UNITED STATES PATENTS
3,457,410   7/1969   Savoca ............................. 250/338
3,569,719   3/1971   Dryden ........................... 250/347 X
3,793,518   2/1974   Harper ............................ 250/347

Primary Examiner—Archie R. Borchelt
Attorney, Agent, or Firm—W. H. MacAllister; W. L. Androlia

[57] ABSTRACT

An electronic circuit utilized in conjunction with a scanning infrared detector to generate pulses which correspond in time to the crossings of the horizon of a preselected radiant body. The pulses are generated by the combination of a bandpass amplifier coupled to the infrared detector, a means coupled to the amplifier for selectively generating a constant amplitude pulse which corresponds in time to the crossing of the horizon of a preselected radiant body, and a means for automatically adjusting the gain of the amplifier. Furthermore, the automatic gain control means selectively responds to the peak amplitude of the output signal of the bandpass amplifier which corresponds in time to the crossing of the horizon of the preselected radiant body.

6 Claims, 3 Drawing Figures

HORIZON SENSOR

FIELD OF THE INVENTION

This invention relates to electronic horizon sensors and more specifically to circuits utilized in conjunction with scanning infrared detectors.

DESCRIPTION OF THE PRIOR ART

Spacecraft frequently require some sensing means to determine flight attitude and to produce error signals which can be utilized for attitude correction and for other purposes. In spacecraft which operate in close proximity to radiant bodies the sensing means often takes the form of a horizon sensor operating in the infrared spectrum.

Briefly stated, the horizon sensor measures the time delay between crossings of the two horizons of a radiant body. This time delay is then compared with a standard time delay to generate an error signal. It is apparent that the accuracy of the flight attitude is directly proportional to the accuracy of the measured time delay.

There are several factors which affect the accuracy of a basic horizon sensor. One major factor is that the amplitude of the output signal of the infrared detector is subject to variation due to variations in the temperature of the radiant body, spin rate variations, degradation with time of the optics associated with the infrared detector, and degradation with time of the infrared detector itself. Another major factor which affects the accuracy of horizon sensors is spurious pulses caused by sensing other radiant bodies in the scan path.

To overcome the amplitude changes due to temperature variations, infrared detectors have been designed and built which are selectively responsive to the emission band of a gaseous atmospheric component which is uniformly distributed at high altitudes. The output signal is substantially constant during a single scan across a radiant body. An example of such an infrared detector is described in U.S. Pat. No. 3,118,063 issued to Kaufman on Jan. 14, 1964.

One method for overcoming substantially all of the factors which affect the amplitude is suggested by U.S. Pat. No. 3,457,410, which issued on June 22, 1969 to R. C. Savoca. In this patent the output of the infrared detector is coupled to a high-pass amplifier. The amplifier does not respond to slow variations in the input signal of the order of the time for a single scan. Therefore, the completed horizon sensor is substantially insensitive to the temperature variations of the radiant body. A portion of the output of the amplifier, which responds only to the leading and trailing edges of the output signal of the infrared detector, is clamped to a fixed voltage. The clamped and unclamped signals are then coupled via a voltage dividing and summing network to a threshold circuit. The components of the network are chosen such that the signal applied to the threshold circuit exceeds the threshold at some fixed ratio of the output signal of the amplifier. Therefore, the threshold level relative to the applied signal is always the same ratio thereby generating rectangular pulses corresponding to horizon crossings which are independent of amplitude variations of the output signal of the infrared detector. This method overcomes the inaccuracies caused by amplitude variations, but is still affected by pulses caused by sensing other radiant bodies.

Accordingly, it is a general object of the present invention to provide a horizon sensor whose accuracy is substantially independent of the amplitude variations of the output signal of the infrared detector.

It is another object of the present invention to provide a horizon sensor whose accuracy is substantially unaffected by other radiant bodies in the scan path.

SUMMARY OF THE INVENTION

In keeping with the principles of the present invention, the objects are accomplished with the unique combination of a scanning infrared detector, a high-pass amplifier, first means for selecting and generating fixed amplitude pulses corresponding in time to the horizon crossings of the preselected radiant body, second means for determining the peak amplitude of the output signals of said amplifier corresponding in time to the horizon crossings of the preselected radiant body, and a third means for setting a fixed ratio between a reference level and the peak magnitude of the output signals from said amplifier. The output of the high-pass amplifier, which responds only to the leading and trailing edges of the output signal of the infrared detector, is coupled to the first and second means. The first means selects the output signal of the amplifier corresponding in time to the horizon crossings of the preselected radiant body and generates a fixed amplitude pulse corresponding to said output signal thereby discriminating against signals corresponding to horizon crossings of other unwanted radiant bodies. The output signal of the second means is coupled to and enables the third means. Therefore, since the output of the second means enables the third means, only the peak magnitude of that portion of the output signal from said amplifier corresponding to horizon crossings of the preselected radiant body is utilized by said third means.

BRIEF DESCRIPTION OF THE DRAWINGS

The above-mentioned and other features and objects of the present invention will become more apparent by reference to the following description taken in conjunction with the accompanying drawings, wherein like reference numerals denote like elements, and in which.

DESCRIPTION OF THE PREFERRED EMBODIMENT

Figure 1:
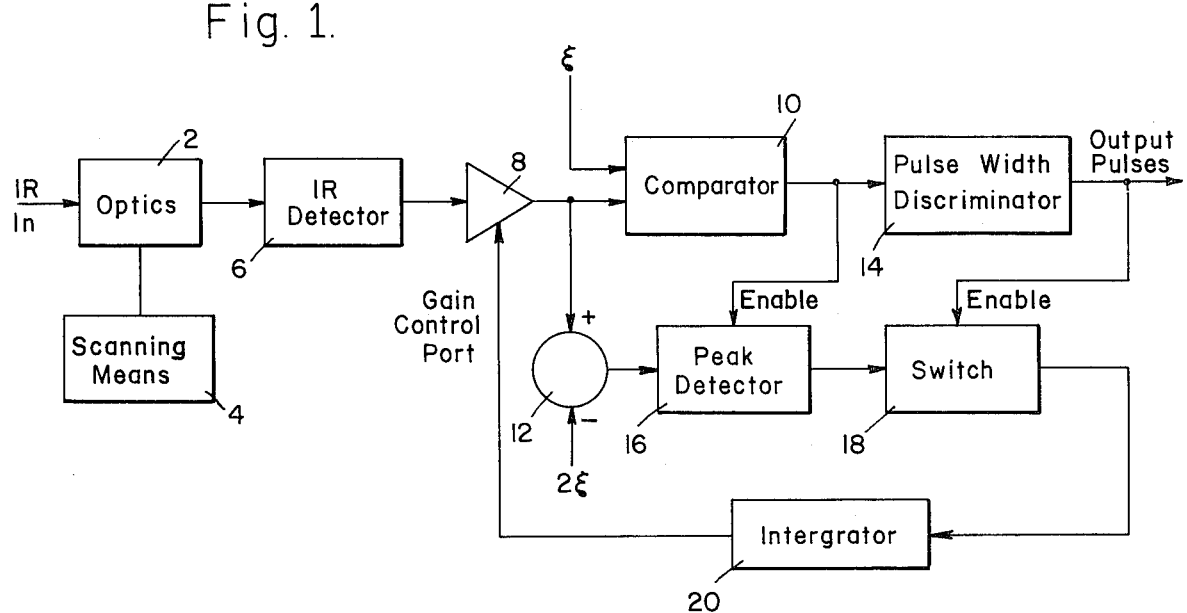
FIG. 1 is a block diagram of a horizon sensor in accordance with the teachings of the present invention.

Referring more specifically to the drawings, FIG. 1 is a block diagram of a horizon sensor circuit designed in accordance with the teachings of the present invention.

In FIG. 1, the horizon sensor circuit includes optics 2 with scanning means 4 which collects the incident infrared radiation and focuses it upon infrared detector 6. The output of infrared detector 6 is coupled to the input of high-pass amplifier 8. The output of amplifier 8 is coupled to one input of comparator 10 and the input of adder 12. Furthermore, comparison voltage of amplitude $\epsilon$ is also applied to the other input of comparator 10. The output of comparator 10 is coupled to the input of pulse width discriminator (PWD) 14 and to the enable input of peak detector 16. The output of PWD 14 is coupled to the enable input of switch 18 and to conventional time delay measuring circuitry, not shown.

In addition, a voltage of amplitude $-2\epsilon$ is applied to adder 12. The output of adder 12 is coupled to the input of detector 16. The output of detector 16 is coupled to the input of switch 18. The output of switch 18 is coupled to the input of integrator 20. The output of integrator 20 is coupled to the gain control port of amplifier 8.

In practice, a high-pass amplifier 8 has frequency response characteristics such that it responds to the rate-of-change of the output signal of infrared detector 8 at a horizon crossing and not to the gradual rate-of-change through a scan across the radiant body.

Figure 2:
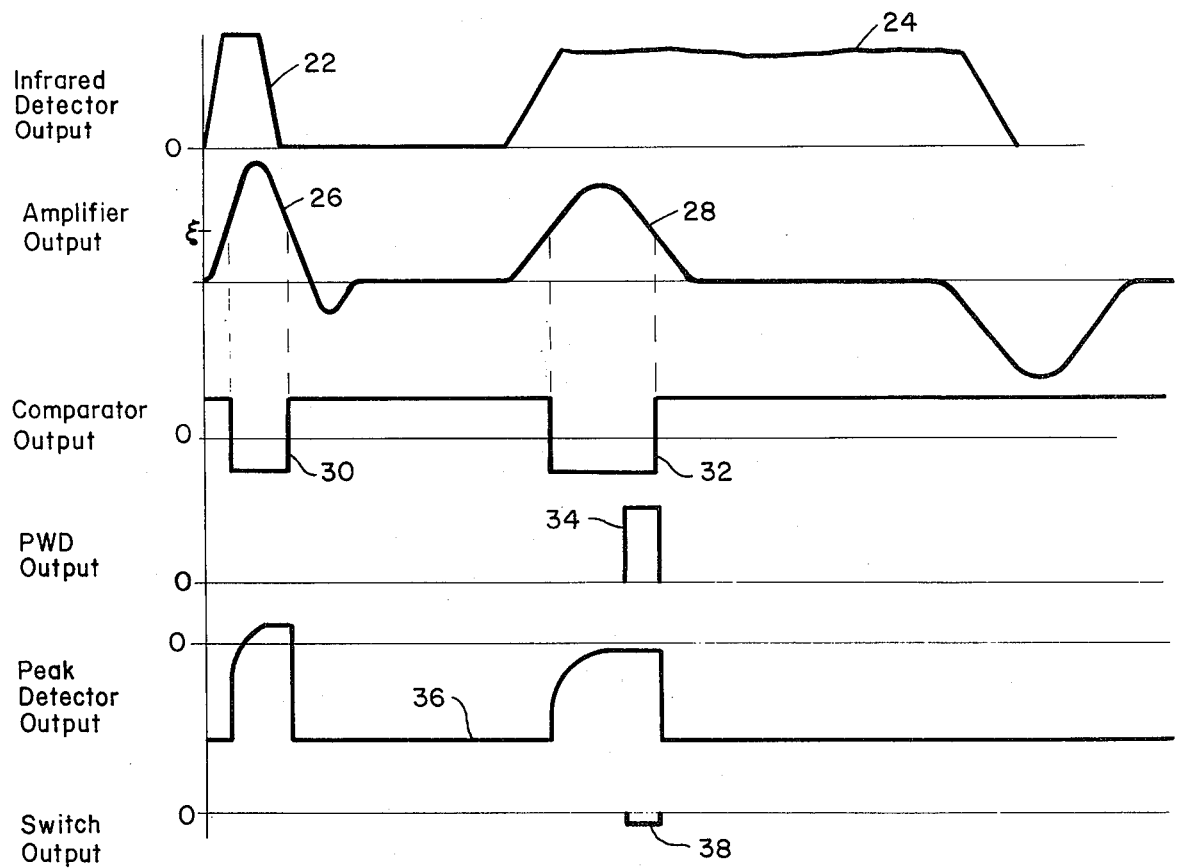
FIG. 2 is a graphic representation of typical waveforms at points in the circuit of FIG. 1.

Referring now to both FIG. 1 and 2, in operation the infrared radiation is collected and focused upon detector 6 by optics 2. Means 4 are provided for scanning the infrared detector across the radiant body. Means 4 can be any type of scanning mechanism whether due to spinning of a spacecraft or moving optical parts which produces a scan. The output of detector 6 as a result of the incident infrared radiation is as shown in FIG. 2 by waveforms 22 and 24. Waveforms 22 and 24 are a worse-case condition wherein waveform 22 represents a signal from an unwanted radiant body of greater magnitude and shorter duration than waveform 24 which represents a signal from the preselected radiant body. The output signal is passed through high-pass amplifier 8 which involves a slight degree of differentiation of which responds only to the leading and trailing edges of waveforms 22 and 24 to produce respectively waveforms 26 and 28. Amplifier 8 has a response frequency such that it responds to the relatively steep slope of waveforms 22 and 24 caused by horizon crossings and does not respond to slow signal changes across the whole scan. Therefore, the horizon sensor will be substantially insensitive to temperature variations across the radiant body.

The output signal of amplifier 8 is applied to comparator 10. Said comparator 10 compares said output signal with a DC comparison voltage of magnitude $\epsilon$. Said comparator 10 triggers each time the positive going signal exceeds the comparison voltage $\epsilon$ and each time the negative going signal drops below the comparison voltage $\epsilon$. Therefore, output pulses 30 and 32 of a fixed magnitude are generated by comparator 10 corresponding respectively to waveforms 26 and 28. It is apparent that a Schmitt trigger or other similar threshold device with a threshold level of $\epsilon$ volts can be substituted for the comparator 10. The output of the comparator 10 passes to the PWD 14. The leading edge of the input pulse to the PWD 14 starts a timer. If the duration of the input pulse is less than W as in waveform 30, an output pulse is not generated and the trailing edge of the input pulse resets the PWD 14. If the duration of the input pulse is greater than W as in waveform 32, an output pulse is generated after time W and again said PWD 14 is reset by the trailing edge of the input pulse as shown in waveform 34. Time constant W is selected so that it is shorter than the minimum duration of the expected pulses from crossings of the horizon of the preselected radiant body but longer than the expected pulses from the crossings of the horizon of other radiant bodies in the scan path. Therefore, the PWD 14 discriminates against unwanted pulses and only generates an output pulse corresponding in time to horizon crossings of the preselected radiant body.

The output pulses of PWD 14 are then applied to various processing circuits of conventional design, often including time delay comparison circuitry to develop AC error signal. Said error signals are utilized for attitude correction, antenna pointing, and other purposes.

Furthermore, as part of the automatic gain control feature of the present invention a portion of the output signal of amplifier 8 is fed into adder 12 where the signal is combined with a negative constant voltage. Said negative voltage has an absolute value of twice the comparison voltage $\epsilon$. The combined signal is coupled to the input of peak detector 16 which determines and holds the peak amplitude of the incoming signal. In addition, said peak detector 16 is set and reset in response to the leading and trailing edges of the output pulses of the comparator 10 thereby producing an output signal as shown by waveform 36 of FIG. 2. The output signal of the peak detector 16 has a peak magnitude corresponding to that of the output signal of amplifier 8 minus $2\epsilon$ volts.

It is apparent from waveform 36 that the peak magnitude of that portion of waveform 36 which corresponds to the unwanted signal is greater than that which corresponds to the desired signal. Therefore, to avoid introducing error into the automatic gain control caused by the unwanted portion of waveform 36, the output peak of detector 16 is passed through switch 18 which is controlled by the output of PWD 14. Said switch 18 is only closed when there is a signal present at the output of PWD 14. Therefore, only that portion of the output of peak detector 16 which corresponds in time to the peak amplitude of the horizon crossing of the preselected radiant body will appear at the output of switch 18 as shown in waveform 38.

To complete the automatic gain control, the peak amplitude of the output signal of switch 18 is integrated, held, and applied to the gain control port of high-pass amplifier 8. Therefore, the gain of amplifier 8 is varied only in response to the peak amplitude variations of the output signal of amplifier 8 which correspond in time to horizon crossings of the preselected radiant body. In this way the peak amplitude of said output signal is kept at substantially a constant value. Since the equivalent to a reference voltage in the automatic gain control is a voltage of magnitude $2\epsilon$, said constant value is equal to $2\epsilon$.

Figure 3:
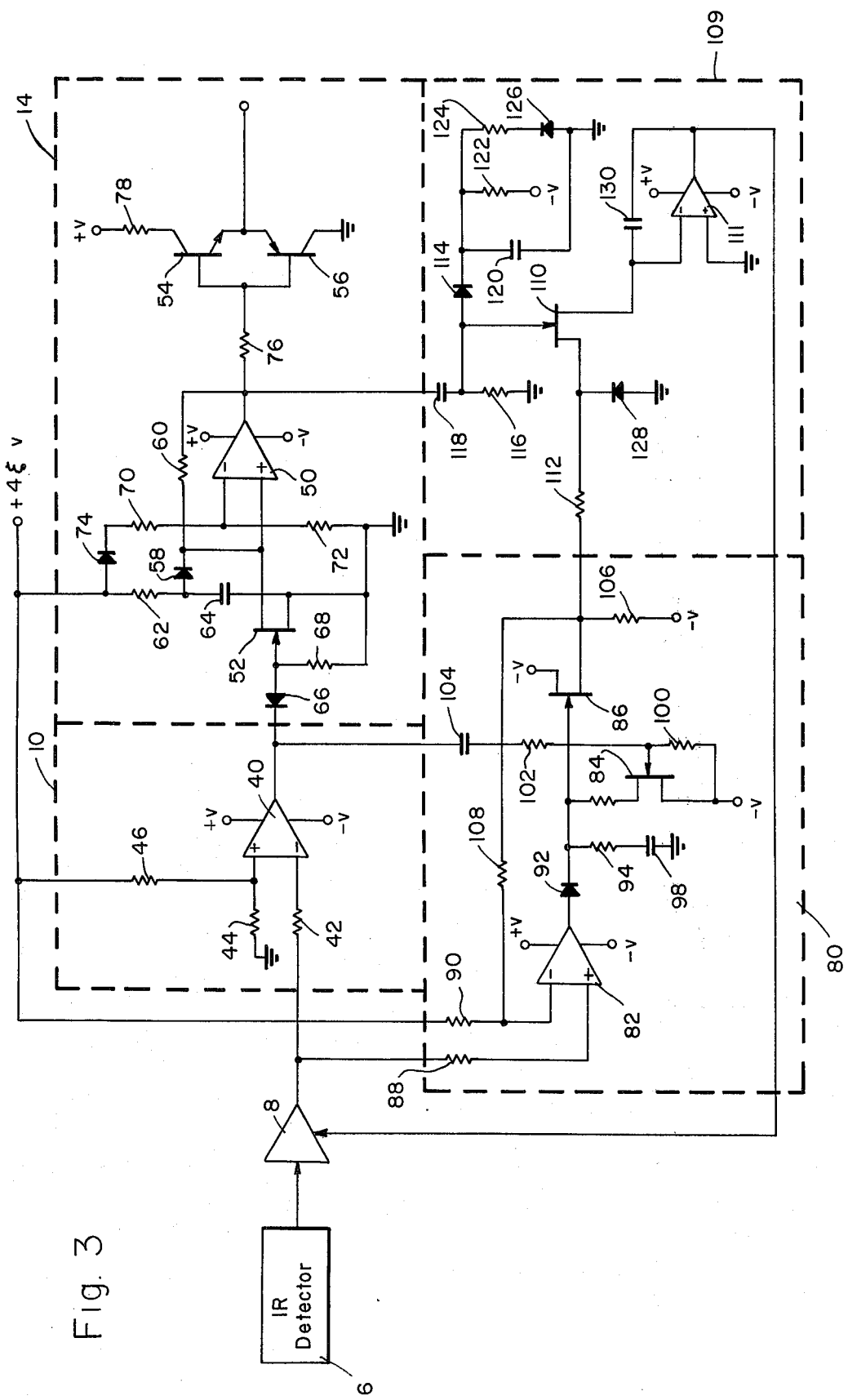
FIG. 3 is an example of a schematic diagram of a horizon sensor in accordance with the teachings of the present invention.

Referring specifically to the schematic diagram shown in FIG. 3, the blocks of FIG. 1 requiring more elaboration will now be discussed in more detail to give a clearer understanding of the present invention.

The comparator 10 includes an operational amplifier 40 having proper positive and negative DC power applied. Amplifier 40 further has both a positive and a negative input. The output of amplifier 8 is coupled through resistor 42 to the negative input of amplifier 40. Resistor 44 is connected between the positive input of amplifier 40 and ground. Resistor 46 is connected between the positive input of amplifier 40 and a source of positive direct current of magnitude $4\epsilon$ volts. In practice, amplifier 40 can be a Harris HA 2700 integrated circuit.

In operation, resistors 44 and 46 act as a voltage divider which divides the applied voltage by 4, thereby causing a voltage of magnitude $\epsilon$ volts to appear at the positive terminal of amplifier 40. When the output signal of high-pass amplifier 8 which is applied to the negative input of amplifier 40 exceeds $\epsilon$ volts, the output of amplifier 40 drops from a positive value to some constant negative value. When said input signal drops below $\epsilon$ volts, the output of amplifier 40 returns to said positive value, thereby generating an output signal such as waveforms 30 and 32.

The PWD 14 includes an operational amplifier 50 having proper positive and negative DC power applied. Amplifier 50 has both a positive and a negative input. PWD 14 further includes a field effect transistor (FET) 52 with drain, gate, and source electrodes and a NPN transistor 54 and a PNP transistor 56, both with base, emitter and collector electrodes. The cathode end of diode 58, the drain electrode of FET 52, and one end of resistor 60 are connected to the positive input of amplifier 50. The other end of resistor 60 is connected to the output of amplifier 50. The other end of diode 58 is connected to the junction formed by one end of resistor 62 and one end of capacitor 64. The anode end of diode 66 and one end of resistor 68 are connected to the gate electrode of FET 52. The cathode end of diode 66 is connected to the output of comparator 10. The other end of resistor 68, the source electrode of FET 52, and the other end of capacitor 64 are grounded.

Furthermore, the negative input of amplifier 50 is connected to the junction formed by one end of resistor 70 and one end of resistor 72. The other end of resistor 70 is connected to the cathode end of diode 74. The other end of diode 74 and the other end of resistor 62 are connected to a positive source of direct current with a magnitude of $4\epsilon$ volts. The other end of resistor 72 is grounded. Resistor 76 is connected respectively between the output of amplifier 50 and the junction formed by the connection of the base electrodes of transistors 54 and 56. The emitter electrodes of transistors 54 and 56 are connected together and are connected to the output terminal of the PWD 14. The collector of transistor 54 is connected through resistor 78 to a positive source of direct current. The collector electrode of transistor 56 is grounded. In practice, amplifier 50 can be an integrated circuit such as Harris HA2700.

In operation, FET 52 is in the conduction state and current flows through resistor 62, diode 58 and FET 52 to ground. Therefore, the charge on capacitor 64 and the voltage at the positive input of amplifier 50 is substantially zero. Furthermore, the output of amplifier 50 in this state is a negative voltage of some magnitude. Resistors 70 and 72 act as a voltage divider and set a constant reference voltage level on the negative input of amplifier 50.

The output pulses from comparator 10 turn FET 52 off and capacitor 64 starts to charge with a time constant dependent upon the values of resistor 62 and capacitor 64. Since capacitor 64 is charging, the voltage that appears at the positive input of amplifier 50 is increasing. The time constant is selected so that voltage applied to the positive input will not exceed the reference voltage applied to the negative input unless the output pulse of comparator 10 is of duration longer than W. As previously stated, W is selected to be longer than the duration of pulses from unwanted radiant bodies. If the voltage applied to the positive input of amplifier 50 exceeds the reference voltage, an output signal of fixed positive amplitude will be generated at the output of amplifier 50. Resistor 60 supplies a slight amount of positive feedback to the positive input to insure that said output signal has a fast rise time. Furthermore, when the output pulse of comparator 10 ceases, FET 52 is turned on and the charge on capacitor 64 and the voltage on the positive input of amplifier 50 returns to said negative value.

Since the output of amplifier 50 swings from some negative value to a positive value and it is desired that the output of the horizon sensor be a pulse with a swing from 0 volts to a positive value, an emitter follower comprising transistors 54 and 56 is coupled to the output of amplifier 50 to provide this function. Therefore, the output signal of the horizon sensor is as shown by waveform 34.

The adder 12 and peak detector 16 functions are both performed by circuit 80. Said circuit 80 includes an amplifier 82 having proper positive and negative DC power applied. Said amplifier 82 has both a positive and a negative input. Said circuit 80 further includes FET's 84 and 86 with drain, gate, and source electrodes. The positive input of amplifier 82 is connected to the output of high-pass amplifier 8 through resistor 88. The negative input of amplifier 82 is connected to a source of positive direct current with a magnitude of $4\epsilon$ volts via resistor 90. The anode and cathode ends of diode 92 are connected respectively to the output of amplifier 82 and the junction formed by one end of resistor 94, one end of resistor 96, and the gate electrode of FET 86. The other end of resistor 94 is connected to one end of capacitor 98. The other end of capacitor 98 is grounded. The other end of resistor 96 is connected to the drain electrode of FET 84.

The source electrode of FET 84 is connected to a negative source of direct current. Resistor 100 is connected between the gate and source electrodes of FET 84. The two ends of resistor 102 are connected respectively to the gate electrode of FET 84 and one end of capacitor 104. The other end of capacitor 104 is connected to the output of comparator 10. The drain electrode of FET 86 is connected to a positive source of direct current. The source electrode of FET 86 is connected via resistor 106 to a negative source of direct current. The two ends of resistor 108 are connected respectively to the negative input of amplifier 82 and the source of FET 86. In practice, amplifier 82 can be an integrated circuit such as National Semiconductor LM108.

In operation, the circuit has two basic operating modes. Each of said operating modes will be considered separately in the following discussion. The first operating mode exists when the output of comparator 10 is at some positive value as shown in FIG. 2. This condition corresponds to a signal of less than $\epsilon$ volts at the output of amplifier 8 thereby indicating that a horizon crossing has not yet occurred. since the positive voltage at the output of comparator 10 is applied to the gate electrode of FET 84 via the series connection of capacitor 104 and resistor 102, said FET 84 is in the conduction state. Since the FET 84 is in the conduction state, the negative voltage applied to the source electrode of FET 84 is applied to the gate of FET 86. Since FET 86 acts as a unity gain, high input impedance amplifier, the output signal of circuit 80 is said negative value as shown in waveform 36.

The second operating mode exists when the output of the comparator 10 is some negative value as shown in waveforms 30 and 32. This condition corresponds to a horizon crossing and an output signal from amplifier 8 of ε volts or greater in amplitude. Since the output of comparator 10 appears at the gate electrode of FET 84, said negative voltage at the gate electrode places FET 84 in the nonconducting state. Therefore, an open circuit is created between the negative voltage appearing at the source electrode of FET 84 and the gate electrode of FET 86. Consequently, for the remainder of the discussion the affects of FET 84 will be ignored.

Furthermore, amplifier 82 and FET 86 together with resistor 108 act as a feedback amplifier. In addition, resistors 90 and 106 act as a voltage adding and dividing circuit. Therefore, the output signal appearing at the source electrode of FET 86 is substantially equal to twice the voltage appearing at the positive input of amplifier 82 minus 4ε volts. Consequently, when the output of amplifier 8 is ε volts which corresponds to an input of ε volts at the positive input of amplifier 82, the output voltage appearing at the source electrode of FET 86 is −2ε volts. If the output of amplifier 8 is 2ε volts, the output voltage appearing at the source electrode of FET 86 is 0 volts. When the output of amplifier 8 is less than 2ε volts but greater than ε volts, the output voltage appearing at the source electrode of FET 86 is some value greater than −2ε volts but less than 0 volts. Similarly, if the output of amplifier 8 is greater than 2ε volts, the output voltage appearing at the source electrode of FET 86 is some value greater than 0 volts. Therefore, the output appearing at the source electrode of FET 86 follows the output of amplifier 8 as shown in waveform 36.

Furthermore, the operation of circuit 80 in this second mode is also modified by the affects of diode 92 and the series connection of resistor 94 and capacitor 98. It is these last three circuit elements which convert an amplifier circuit into a peak detector. As the output of amplifier 82 rises, capacitor 98 charges through resistor 94. When the output of amplifier 82 reaches its peak value, the voltage appearing across capacitor 98 corresponds to said peak value. When the output of amplifier 82 then starts to go in the negative direction again, diode 92 is back biased thereby preventing a change in the charge and therefore the voltage on capacitor 98. Since FET 86, FET 84, and diode 92 appear as high impedances to capacitor 98, there are no low impedance discharge paths for the charge on capacitor 98. Therefore, capacitor 98 will hold the peak amplitude of the output of amplifier 82 and the output signal at the source electrode of FET 86 is also held at the peak value.

When the comparator 10 output signal returns again to some positive value, FET 84 turns on again thereby discharging capacitor 98 and dropping the output of circuit 80 to some negative value again. Therefore, as the operation mode of circuit 80 switches between its two operating modes in response to the output signal of comparator 10, a complete output signal as shown by waveform 36 is generated.

The switch 18 and integrator 20 functions are performed by circuit 109. Said circuit 109 includes a FET 110 with gate, source and drain electrodes. Said circuit 109 further includes an amplifier 111 with both a positive and a negative input. The output of circuit 80 is connected to the drain electrode of FET 110 through resistor 112. The gate electrode of FET 110 is connected to the anode end of diode 114 and the junction formed by one end of resistor 116 and capacitor 118. The other end of resistor 116 and the other end of capacitor 118 are connected respectively to ground and the output of amplifier 50 of PWD 14.

The cathode of diode 114 is connected to the junction formed by one end of capacitor 120, one end of resistor 112, and one end of resistor 124. The other end of resistor 122 is connected to a negative source of direct current. The other end of resistor 124 is connected to the cathode of diode 126. The other end of capacitor 120 and the anode of diode 126 are grounded. The cathode and anode of diode 128 are connected respectively to the drain electrode of FET 110 and ground. The source electrode of FET 110 is connected to the negative input of amplifier 111. Furthermore, proper positive and negative DC power is applied to amplifier 111.

The positive input of amplifier 111 is grounded. Capacitor 130 is connected between the output and the negative input of amplifier 111. The output of amplifier 111 is connected to the gain control port of high-pass amplifier 8. In practice, amplifier 111 can be an integrated circuit such as National Semiconductor's LH0022.

In operation, resistor 112 is selected to be a very large resistance, typically in the megohm range. Therefore, the output signal from circuit 80, which is a voltage, is converted into a current and applied to drain electrode of FET 110. Said FET 110 performs the actual switching function and responds to the output signal of amplifier 50 of PWD 14.

Capacitor 118 and resistor 116 AC couple the output signal of amplifier 50 of PWD 14 to the drain electrode of FET 110. That portion of circuit 109 comprising diodes 114 and 126, capacitor 120, and resistors 122 and 124 is a clamping circuit which clamps the signal appearing at the gate electrode of FET 110 to substantially 0 volts. Therefore, since the output signal of amplifier 50 of PWD 14 swings from a negative value to a positive value when an input pulse exceeds the required duration, the signal appearing at the gate electrode of FET 110 swings from a very negative value to a substantially zero value.

When the signal level at the gate electrode of FET 110 is 0 volts, the source and drain electrodes of FET 110 are electrically connected together thereby passing the current signal from resistor 112 to the negative input of amplifier 111. That portion of circuit 109 comprising amplifier 111 and capacitor 130 is a current integrator. Consequently, the said current signal is integrated to generate a correction voltage which is applied to the gain control port of high-pass amplifier 8.

When the signal level at the gate electrode of FET 110 returns to a very negative value, FET 110 ceases to conduct and the output of circuit 80 is electrically disconnected from the input of said integrator. To insure fast and complete turn off of FET 110, diode 128 insures that the gate potential of FET 110 during turn off is always very negative relative the drain electrode. Diode 128 further insures that FET 110 does not turn on until the gate potential is substantially 0 volts. Since FET 110 is turned on and off essentially by the output signal of PWD 14, only the peak amplitude of the signals corresponding in time to horizon crossings of the preselected radiant body is coupled to the input of said integrator portion. Therefore, the gain of amplifier 8 is only affected by the peak amplitude of the signals corresponding in time to horizon crossings of the preselected radiant body.

It should be apparent to those skilled in the art that the implementation of the above-described embodiment could be varied by using the output voltage of the integrator to vary threshold level of comparator 10 instead of the gain of amplifier 8 without departing from the scope of the invention. In all cases it is understood that the above-described embodiments are merely illustrative of but a small number of the many possible specific embodiments which represent the application of the principles of the present invention. Furthermore, numerous and varied other arrangements can be readily devised in accordance with the principles of the present invention by those skilled in the art without departing from the spirit and scope of the invention.

What is claimed is:

1. A horizon sensor comprising, in combination:
   an infrared detector for producing an output signal in response to radiant energy input thereto;
   means for scanning said infrared detector across a spatial region which includes at least one radiant body;
   a high-pass amplifier having at least one input and an output, one of said inputs being coupled to the output of said infrared detector, said amplifier having a response characteristic sensitive to the rate-of-change of the detector output signal at a crossing of a horizon of a radiant body and substantially insensitive to gradual changes through a scan across said radiant body;
   first means coupled to said amplifier output for generating output pulses of substantially constant amplitude during the time interval wherein said amplifier output signals exceed a reference level;
   second means coupled to said first means for transmitting at least a portion of those output pulses corresponding to horizon crossings of a preselected radiant body;
   third means coupled to the output of said amplifier for selecting and holding the peak amplitude of the output signals of said high-pass amplifier corresponding to horizon crossings of said preselected radiant body;
   fourth means responsive to said peak amplitude for setting a fixed ratio between said reference level and the peak amplitude of the output signals of said high-pass amplifier corresponding to said preselected radiant body; and
   fifth means for coupling the transmitted output pulses from said second means to a utilization device.

2. A horizon sensor according to claim 1 wherein said first means comprises a comparator for generating output pulses of substantially constant amplitude during the time interval wherein said amplifier output signals exceed a reference level.

3. A horizon sensor according to claim 2 wherein said second means comprises a pulse width discriminator, said pulse width discriminator being of the type which transmits only those portions of said output pulses exceeding a specified width.

4. A horizon sensor according to claim 3 wherein said third means comprises:
   a peak detector having at least one input and an output, one of said inputs being coupled to the output of said amplifier, said peak detector being set and reset by the output signal of said comparator; and
   a normally open switch having an input and an output, said input being coupled to the output of said peak detector, said switch being responsive to the output signal of said pulse width discriminator.

5. A horizon sensor according to claim 4 wherein said fourth means comprises:
   means for controlling the gain of said high-pass amplifier; and
   an integrator having an input and an output, said input and output coupled respectively to the output of said switch and said gain control means.

6. A horizon sensor comprising, in combination:
   an infrared detector for producing an output signal in response to radiant energy input thereto;
   means for scanning said infrared detector across a spatial region which includes at least one radiant body;
   a high-pass amplifier having at least one input, output, and gain control port, said input being coupled to the output of said detector, said amplifier further having a response frequency corresponding to the rate-of-change of the output signal of said detector at a horizon crossing but being too short to respond to gradual changes in said signal through a scan across a radiant body;
   a comparator having at least one input and output, said input being coupled to the output of said amplifier, said comparator further generating a constant magnitude output pulse during the time interval wherein said amplifier output signals exceed a specified reference level;
   a pulse width discriminator having at least one input and output, said input being coupled to the output of said comparator, said pulse width discriminator transmitting only those portions of said output pulses exceeding a specified width;
   a negative voltage of amplitude twice the reference level;
   first means coupled to the output of said amplifier for additively combining said negative voltage and the output signal of said amplifier to form a composite signal;
   a peak detector having at least one input and an output;
   second means for coupling said composite signal to the input of said peak detector, said peak detector further detecting and holding the peak amplitude of an applied input signal during the the time interval wherein a pulse is present at the output of said comparator;
   a normally open switch having at least one input and an output, said input being coupled to the output of said peak detector, said switch being responsive to an output signal of said pulse width discriminator;
   an integrator having an input and an output, said input and output being coupled respectively to the output of said switch and the gain control port of said amplifier, said integrator developing a gain correction voltage, said correction voltage being applied to said gain control port to set a fixed ratio between the magnitude of the reference level and the peak magnitude of an output signal from said switch; and
   third means for coupling the transmitted output pulses from said second means to a utilization device.

* * * * *